United States Patent
Kim et al.

(10) Patent No.: US 9,313,314 B2
(45) Date of Patent: Apr. 12, 2016

(54) WIRELESS NETWORK CONNECTION CONTROLLING METHOD USING DEVICE IMPACT, APPLICATION PROGRAM CONTROLLING METHOD, AND DEVICES THEREOF

(75) Inventors: Jin Young Kim, Seongnam-shi (KR); Jin Yeop Chang, Yongin-shi (KR); Hyo Jin Yoon, Yongin-shi (KR); Won-Il Lee, Seoul (KR); Chung Hyeok Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 1026 days.

(21) Appl. No.: 13/265,559

(22) PCT Filed: Mar. 23, 2010

(86) PCT No.: PCT/KR2010/001755
§ 371 (c)(1),
(2), (4) Date: Jan. 3, 2012

(87) PCT Pub. No.: WO2010/123204
PCT Pub. Date: Oct. 28, 2010

(65) Prior Publication Data
US 2012/0140676 A1    Jun. 7, 2012

(30) Foreign Application Priority Data
Apr. 21, 2009 (KR) .................. 10-2009-0034616

(51) Int. Cl.
*H04L 12/28* (2006.01)
*H04M 1/725* (2006.01)
(Continued)

(52) U.S. Cl.
CPC .......... *H04M 1/7253* (2013.01); *G06F 1/1694* (2013.01); *G06F 2200/1636* (2013.01); *H04L 41/04* (2013.01); *H04L 41/12* (2013.01); *H04M 2250/12* (2013.01); *H04Q 1/00* (2013.01)

(58) Field of Classification Search
CPC .......... H04Q 1/00; H04L 41/12; H04L 45/02; H04L 45/00; H04L 45/04; H04L 41/04; H04M 1/7253; H04M 2250/12; G06F 1/1694; G06F 2200/1636
See application file for complete search history.

(56) References Cited

U.S. PATENT DOCUMENTS

2002/0090912 A1 * 7/2002 Cannon et al. .................. 455/41
(Continued)

FOREIGN PATENT DOCUMENTS

| CN | 101099303 A | 1/2008 |
|---|---|---|
| JP | 2003047062 A | 2/2003 |

(Continued)

OTHER PUBLICATIONS

Communication, dated Jul. 30, 2013, issued by the Japanese Patent Office, in counterpart Application No. 2012507135.
(Continued)

*Primary Examiner* — Lonnie Sweet
(74) *Attorney, Agent, or Firm* — Sughrue Mion, PLLC

(57) ABSTRACT

Wireless network connection control method of performing control for establishing and releasing wireless network connection with another device when impacts are applied to devices, application program control method of performing control for setting and executing application program when impacts are applied to devices, and device including wireless network connection control function and application program control function which use a device impact are disclosed. According to the present invention, provided is a wireless network connection control method of a device using a device impact, including generating a corresponding impact event when physical impact applied from the outside is sensed, transceiving a search message between devices based on a time at which the impact event occurred, searching for another device in which the impact event has occurred at the same time, and performing a predetermined protocol with a corresponding device according to a search result and establishing an inter-device wireless network connection.

36 Claims, 2 Drawing Sheets

(51) Int. Cl.
   *G06F 1/16*   (2006.01)
   *H04Q 1/00*   (2006.01)
   *H04L 12/24*  (2006.01)

(56) References Cited

U.S. PATENT DOCUMENTS

| | | | |
|---|---|---|---|
| 2005/0216867 A1* | 9/2005 | Marvit | G06F 1/1613 715/863 |
| 2007/0188323 A1* | 8/2007 | Sinclair et al. | 340/568.1 |
| 2007/0213045 A1* | 9/2007 | Hermansson | G06F 1/1613 455/425 |
| 2008/0166966 A1 | 7/2008 | Hamasaki et al. | |
| 2008/0195735 A1* | 8/2008 | Hodges | G06F 1/1626 709/227 |
| 2009/0017822 A1* | 1/2009 | Kim et al. | 455/436 |
| 2010/0167646 A1* | 7/2010 | Alameh | G06F 3/017 455/41.2 |

FOREIGN PATENT DOCUMENTS

| | | |
|---|---|---|
| JP | 2003152861 A | 5/2003 |
| JP | 2004289584 A | 10/2004 |
| JP | 2006-174383 A | 6/2006 |
| JP | 2008287602 A | 11/2008 |
| KR | 10-2005-0100753 A | 10/2005 |
| KR | 10-2005-0100753 A1 | 10/2005 |
| KR | 10-2006-0130348 A | 12/2006 |
| KR | 10-0678112 B1 | 2/2007 |
| WO | 2004/062131 A1 | 7/2004 |
| WO | 2006/040651 A1 | 4/2006 |
| WO | 2006068115 A1 | 6/2006 |
| WO | 2009/014438 A1 | 1/2009 |

OTHER PUBLICATIONS

Communication dated Oct. 8, 2013 from the State Intellectual Property Office of P.R. China in a counterpart application No. 201080018131.2.

Communication dated Dec. 11, 2014, issued by the European Patent Office in counterpart European Application No. 10767219.8.

* cited by examiner

< DEVICE >

WIRELESS NETWORK CONNECTION CONTROLLING METHOD USING DEVICE IMPACT, APPLICATION PROGRAM CONTROLLING METHOD, AND DEVICES THEREOF

BACKGROUND

1. Field

The subject matter described herein relates to a wireless network connection control method, an application program control method of a device, and a device thereof, and more particularly, to a wireless network connection control method of performing control for establishing and releasing a wireless network connection with another device when impacts are applied to devices, an application program control method of performing control for setting and executing an application program when physical impacts are applied to devices, and a device including a wireless network connection control function and an application program control function which use a physical impact.

For example, according to the subject matter, when physical impacts are applied to devices (for example, directly hitting a device, applying vibration to a device, hitting a table on which a device is placed, or contact (a collision, an impact), or the like between devices), corresponding control related to establishment and release of a wireless network connection with another device is performed (a user can easily perform an interface operation on wireless network connection control), or corresponding control related to setting and execution of an application program is performed (the user can easily perform an interface operation on application program control).

2. Description of the Related Art

Recently, various kinds of wireless network techniques have been developed. Each wireless network technique uses a protocol of a complicated process so as to increase extension of more functions and efficiency.

For example, in the case of an inter-device wireless network connection protocol such as a wireless personal area network (WPAN) (for example, Bluetooth or Zigbee) or WiFi, one device broadcasts an advertisement message (a beacon signal) for a network connection, and other devices transmit a response message in response to the advertisement message. Thereafter, a wireless network connection is established through a handshake process defined between the two devices.

A mobile device such as a mobile phone establishes a connection using Bluetooth of the WPAN, infrared-ray (IR) communication, or a wired connector.

In a wireless universal serial bus (USB), a dongle is used, and a wireless network connection is established between the dongle and a USB body through a high-speed ultra-wideband (UWB) communication scheme.

Of the aforementioned conventional techniques, in the case of the WPAN, a wireless network connection is established by a process of searching for and connecting all of neighboring devices. However, in this case, there is a problem in that a control right and safety related to the wireless network connection are not guaranteed to the user.

For example, a control function may be provided to the user such that the device shows the user a list of devices to which the advertisement message is transmitted and a list of devices that reply to the advertisement message. However, in this case, a human interface device such as a screen is necessarily required so as to show the list to the user, and a network connection function can be provided through the human interface device. However, since an operation of searching for all short-range devices is performed in addition to a connection establishing work designated by the user, it is inefficient in terms of work time and energy consumption. In particular, the inefficiency increases under circumstances in which many devices are concentrated. Further, there is an energy waste factor such as a radio frequency (RF) standby state required for RF transmission/reception for establishing a connection. If the RF standby state is manually controlled, it is inconvenient since user control is required each time a connection is established.

Further, names of searched devices may be duplicated or wrongly recognized. In this case, the user has to discriminate between devices having the same name, which may cause inconvenience to the user feels and a risk in terms of security. For these reasons, it is difficult for the user to properly perform control related to the wireless network connection (for example, bluejacking)

Further, wireless network connection information is shown to the user, but since a wireless network connection process is not intuitive, only a user who is familiar with a corresponding technical field or a corresponding connection tool (an expert having knowledge and experience) can perform concrete control on the concrete wireless network connection.

Meanwhile, wireless network connection methods between mobile devices using the aforementioned conventional techniques also have the same problems as in the WPAN. The user interface can be provided, but a connection may be wrongly established due to duplication and wrong recognition of device names. Further, since all neighboring devices are targets, a time taken for a wireless network connection (device searching) is long, a wireless network connection between devices is delayed, and an RF function control problem similarly exists.

Further, of the aforementioned conventional techniques, in the case of the wireless USB, fixed (non ad-hoc) wireless communication is performed between the dongle and the USB body. However, it is not dynamic (ad-hoc) wireless network connection establishment, and in order to perform a desired task through an established wireless connection, a wireline connection task of physically connecting the dongle to another device is additionally required.

In summary, the aforementioned conventional techniques do not provide an interface through which normal users who are not experts on the wireless network connection can intuitively recognize connection settings between devices. A wireless network connection target device is not selected by the user but selected after all wireless network connections are searched.

Thus, there is an urgent need for a technique allowing normal users who are not experts on various kinds of wireless network techniques to easily perform an interface operation on wireless network connection control without knowledge and understanding of corresponding techniques and capable of increasing efficiency in terms of time and energy and improving security.

Further, with regard to interfaces, it is difficult to guarantee the user's wireless network connection control by an existing interface using a button and a screen due to miniaturization of devices and diversification of functions, and thus there is an urgent need for a new interface technique different from the existing interface. For example, there is an urgent need for a simple intuitive interface technique of allowing the user to easily perform an interface operation on control related to setting and execution of an application program as well as an interface technique on wireless network connection control.

SUMMARY OF THE INVENTION

The present invention is made to resolve the aforementioned problems and satisfy the above needs, and the present invention is directed to provide a wireless network connection control method of performing corresponding control related to establishment and release of the wireless network connection with another device when physical impacts are applied to devices, an application program control method of performing corresponding control related to setting and execution of an application program when physical impacts are applied to devices, and a device including a wireless network connection control function and an application program control function which use a physical impact.

For example, the present invention is also directed to performing corresponding control related to establishment and release of a wireless network connection with another device (allowing the user to easily perform an interface operation on wireless network connection control) or performing corresponding control related to setting and execution of an application program (allowing the user to easily perform an interface operation on application program control) when physical impacts are applied to devices (for example, directly hitting a device, applying vibration to a device, hitting a table on which a device is placed, or contact (a collision, an impact), or the like between devices).

The objects of the present invention are not limited to the above-mentioned objects, and other objects and advantages of the present invention which are not mentioned above can be clearly understood by the following description and exemplary embodiments of the present invention. Further, it would be understood that the objects and advantages of the present invention can be achieved by means stated in claims or a combination thereof.

According to a first method of the present invention for achieving the above objects, there is provided a wireless network connection control method of a device, including: generating a corresponding impact event when a physical impact applied from the outside is sensed; transceiving a search message between devices based on a time at which the impact event occurred and searching for another device in which the impact event has occurred at the same time; and performing a predetermined protocol with a corresponding device according to a search result and establishing an inter-device wireless network connection.

The first method of the present invention may further include establishing an inter-device wireless network connection in a previously defined special relation on an impact event occurring within a certain time from the time at which the impact event occurred when the result of searching for the other device is that no device is found.

The first method of the present invention may further include: generating a wireless network connection release impact event when the physical impact applied from the outside is sensed in a state in which a wireless network is connected between devices; transceiving a search message between the devices based on a time when the wireless network connection release impact event has occurred and searching for another device in which the impact event has occurred at the same time; and performing a predetermined protocol with a corresponding device when a device found as the search result is a device that is already connected and releasing the inter-device wireless network connection.

Meanwhile, according to a second method of the present invention, there is provided an application program control method of a device, including: generating a corresponding impact event when physical impact applied from the outside is sensed in a state in which a wireless network is connected between devices; transceiving a search message between the devices based on an time at which the impact event occurred and searching for another device in which the impact event has occurred at the same time; and transferring a search result to an application program and performing execution of a function provided by the application program and changing of settings.

Further, the second method of the present invention may further include executing a previously defined special function on an impact event occurring within a certain time from the time at which the impact event occurred when the result of searching for the other device is that no device is found.

Further, according to the present invention, there is provided a computer readable recording medium recording a program for executing the first method or the second method.

Meanwhile, according to a device of the present invention, there is provided a device having a wireless communication function, including: an impact sensor that senses physical impact applied from the outside; and a control unit that establishes a wireless network connection with a corresponding device by transceiving a search message between devices through a wireless communication unit based on a time at which the impact event occurred and searching for another device in which an impact event has occurred at the same time when an impact value exceeding a predetermined threshold value is sensed by the impact sensor.

The device of the present invention may further include a timer that counts the time at which the impact event occurred, and the control unit may transmit the search message to another device to search for the other device and include a count value acquired by the timer in the search message as the time at which the impact event occurred.

The device of the present invention may further include an absolute time acquiring unit that acquires a current time, and the control unit may transmit the search message to another device to search for the other device and include an absolute time at which the impact event occurred acquired by the absolute time acquiring unit in the search message.

As described above, according to the present invention, by applying a physical impact to a device, the user(s) can easily establish an inter-device wireless network connection and easily release an inter-device wireless network connection.

Further, according to the present invention, by applying physical impact to a device, the user can easily change or execute settings of a device application program.

Furthermore, according to the present invention, by providing the user with a simple intuitive interface using physical impact, a normal user who is not an expert can configure a personalized application wireless network that can satisfy the user's needs through ease control and configure a personalized application program by correcting an application program easily.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

REFERENCE SIGN LIST

11: wireless communication unit
12: impact sensor
13: control unit
14: timer

DETAILED DESCRIPTION OF EXEMPLARY EMBODIMENTS

The above mentioned objects, features, and advantages will become clearer from the following detailed description which will be made with the accompanying drawings. Thus, those skilled in the art will easily embody the technical spirit of the present invention. Further, when it is judged that a concrete description on a known technique related to the present invention unnecessarily makes vague the gist of the present invention, a detailed description thereof will be omitted.

The present invention provides a wireless network connection control method using device physical impact (first embodiment) of performing corresponding control related to establishment and release of wireless network connection with another device when physical impact is applied to a device.

The present invention also provides an application program control method using physical impact (second embodiment) of performing corresponding control related to setting and execution of an application program when physical impact is applied to a device.

According to the present invention, when physical impacts are applied to devices (for example, directly hitting a device, applying vibration to a device, hitting a table on which a device is placed, or contact (a collision, an impact), or the like between devices), corresponding control related to establishment and release of wireless network connection with another device is performed (the user is allowed to easily perform an interface operation on wireless network connection control), or corresponding control related to setting and execution of an application program is performed (the user is allowed to easily perform an interface operation on application program control).

For example, according to the present invention, a simple intuitive interface using physical impact is provided to the user, and thus the user can easily perform dynamic wireless network connection establishing/releasing control or dynamic application program setting/executing control. Further, the user can configure a personalized application wireless network or a personalized application program that can satisfy the user's needs through easy control.

Hereinafter, exemplary embodiment of the present invention will be described in detail with reference to the accompanying drawings.

Figure 1:
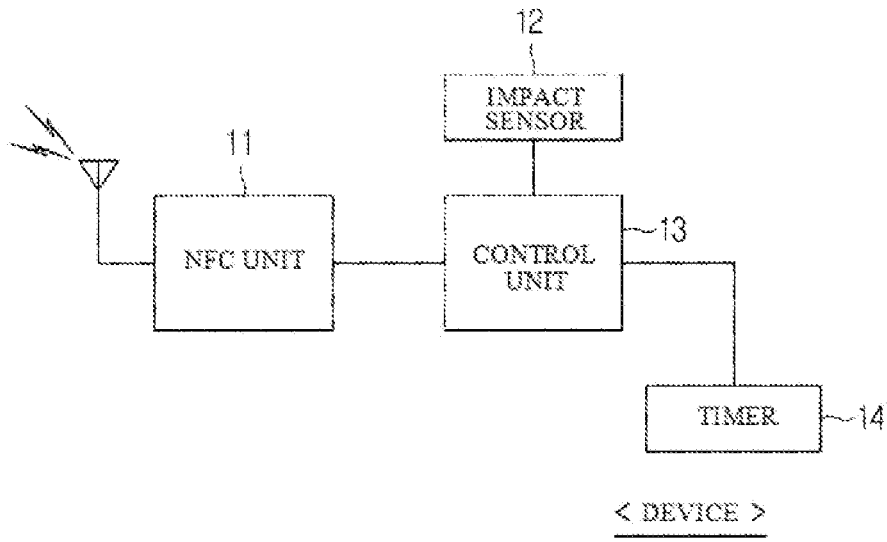
FIG. 1 is a configuration diagram of a device according to an embodiment of the present invention.

FIG. 1 is a configuration diagram of a device according to an embodiment of the present invention.

As illustrated in FIG. 1, the device according to the present invention includes a wireless communication unit (RF module) 11, an impact sensor (or a vibration sensor or the like) 12, a control unit (a central processing unit (CPU) or a microcontroller unit (MCU)) 13, a timer 14, and the like.

In the present invention, the wireless communication unit 11 may be implemented by a radio signal transceiving function like Bluetooth, WiFi, Zigbee, or a wireless USB, and the impact sensor 12 may be implemented by a sensing function capable of sensing physical impact, a contact, vibration, or the like which is applied to the device.

Meanwhile, in the present invention, the timer 14 may be implemented by a hardware component such as a clock generator or a software program. Of course, the timer 14 may be mounted inside the control unit 13.

As described above, the device according to the present invention may be implemented by any radio device regardless of a model, a specification, the type of network, and the like. Examples of the device according to the present invention include a mobile device such as a sensor network terminal, a smart phone, or a mobile phone, a media device such as a wireless USB memory, a smart card, an MP3 player, or a portable multimedia player (PMP), a radio, a notebook computer, a wireless controller (mote), and the like.

Figure 2:
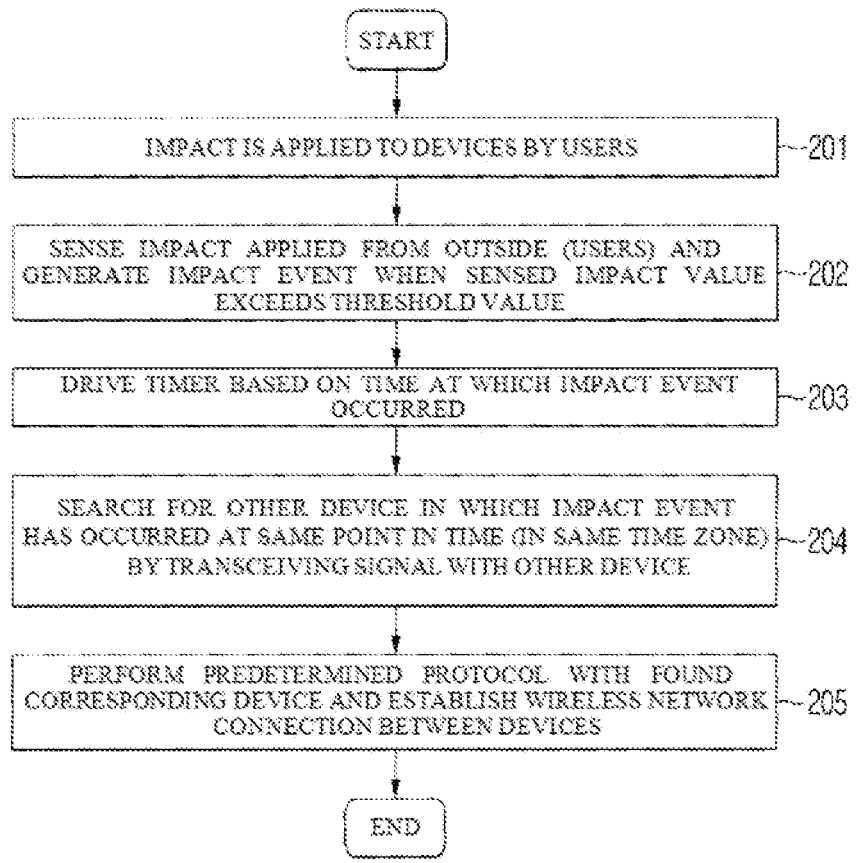
FIG. 2 is a flowchart illustrating a wireless network connection control method using device physical impact according to an embodiment of the present invention.

FIG. 2 is a flowchart illustrating a wireless network connection control method using physical impact according to an embodiment of the present invention. FIG. 2 shows a wireless network connection establishing process using an algorithm that is most basic in the present invention.

Further, in the present invention, a wireless network connection establishing/releasing process may be performed among a plurality of devices, but to help with understanding with the present invention, a description will be made in connection with a case in which the wireless network connection establishing/releasing process is performed between two devices.

When the users desire to establish the wireless network connection between two devices (in a state in which the devices are powered on), the users apply physical impacts to the devices, respectively (step 201). At this time, the physical impacts are preferably applied to the devices at the same point in time (in around the same time). The physical impacts may be applied to the devices by various methods, for example, by directly hitting the devices with a hand or an object, applying vibration to the devices, indirectly hitting a table on which the devices are placed, or contacting the devices with each other (a collision, an impact, or the like). One user may apply the physical impact to the two devices at the same time, or two users may apply the physical impacts to the devices at the same time in a cooperative manner.

The impact sensor 12 of each device senses the physical impact applied from the outside (the user), generates an impact event when a sensed impact value (intensity of the impact) exceeds a threshold value, and transfers the generated impact event to the control unit 13 (step 202). Here, since the impact sensor 12 generates the impact event when the impact value exceeds the threshold value, the occurrence of an impact event unintended by the user such as weak vibration is filtered, thereby preventing the wireless network connection from being erroneously established between the devices.

Then, the control unit 13 of each device detects the occurrence of the impact event and drives the timer 14 based on a time at which the impact event occurred (step 203).

Thereafter, the control unit 13 of each device drives the wireless communication unit 11, exchanging a signal with another device based on the driving time of the timer 14, and searches for another device in which the impact event has occurred at the same time (in around the same time) (step S204). The process of searching for the device in which the impact event has occurred will be described below in detail with reference to FIG. 3.

Subsequently, each device (the control unit 13) performs a predetermined protocol with the searched device according to a result of searching for the device in which the impact event has occurred and establishes the wireless network connection between the devices (step 205). The predetermined protocol refers to a protocol used in the wireless network to which the devices belong and is not limited to a specific protocol.

Additionally, in the present invention, the content of the wireless network connection establishing process is provided to the user through a screen, a speaker, or the like, and so the user can perform advanced settings related to establishment of the wireless network connection or the like, a function change, or the like through button selection. Of course, this is similarly performed even in the wireless network connection release process and an application program control process which will be described later.

Meanwhile, when the result of searching for the device in which the impact event has occurred is that no device in which the impact event has occurred is found (search failure), for example, when there is no device in which the impact event has occurred at the same point in time (in around the same time) (for example, when the user applies the physical impact to only one device), each device (the control unit 13) causes each device to enter a state for establishing a previously defined specific connection (recognizes it as the impact event applied to only one device and gives a command for causing each device to enter a previously defined state). Thus, each device establishes or releases an inter-device wireless network connection of a previously defined special relation (for example, a server-client relation connection, a parent-child relation connection, or the like) when an impact event occurs within a certain time period from the point in time at which the impact event occurred.

As another example, when the result of searching for the device in which the impact event has occurred is that no device in which the impact event has occurred is found (search failure), for example, when there is no device in which the impact event has occurred at the same point in time (in around the same time) (for example, when the user applies the physical impact to only one device), each device causes each device to enter a state for performing a previously defined specific operation (recognizes it as the impact event applied to one device and gives a command for causing each device to enter a state of performing a previously defined operation). Thus, the device executes a previously defined special function when an impact event occurs within a certain time period from the point in time at which the impact event occurred. Thus, the device can be functionally extended to receive various commands as well as a basic operation.

In the present invention, the application program includes all applications such as a network-based application driven on the wireless network (for example, a messenger, a contents downloader, and a file sharing application) and a device-based application driven on a device (for example, a contents player and a schedule manager) and is not limited to a specific application.

For example, in the case of the file sharing program, when the device detects the impact event, information such as the occurrence of the event, devices in which the same event has occurred, and the number of times of the physical impact is transferred to the file sharing program operating in the device. The file sharing program receives the information as a control command and executes a function, for example, of transceiving files or synchronizing contents through the wireless network connection with the corresponding device(s).

As another example, when the device transfers information on the impact event to the contents player program, previously stored contents may be replayed and output through a screen, a speaker, or the like according to predetermined user settings.

Meanwhile, in the present invention, wireless network connection control between a device having an impact sensor and a device having no impact sensor is also considered.

For example, the device having no impact sensor may show, to the user, the content of a device search message according to the occurrence of the impact event received from the device having the impact sensor through a separate interface such as a sound or a screen through a user interface (for example, a screen), and the wireless network connection may be established or released between the corresponding devices according to the user's selection.

Next, the process of searching for the device in which the impact event has occurred will be described in detail with reference to FIG. 3.

Figure 3:
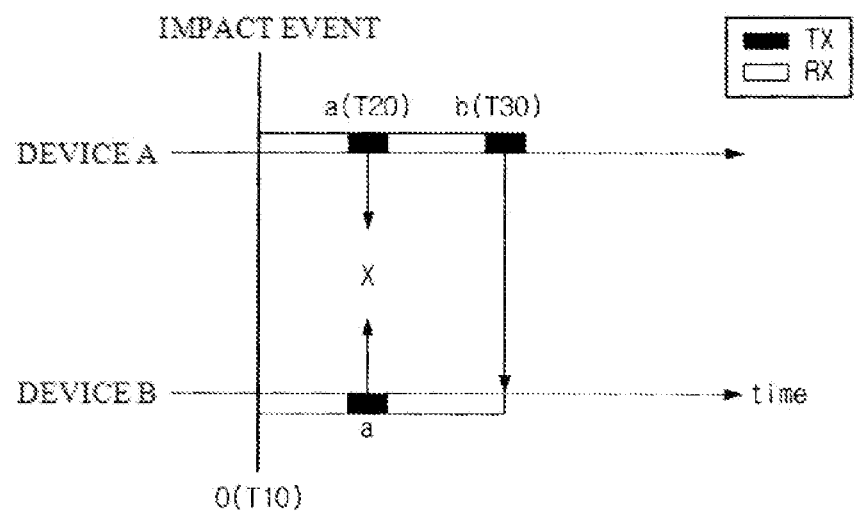
FIG. 3 is an exemplary diagram for explaining a process of searching for a device in which an impact event has occurred illustrated in FIG. 2.

FIG. 3 is an exemplary diagram for explaining the process of searching for the device in which the impact event has occurred illustrated in FIG. 2. In particular, FIG. 3 shows an RF communication attempt state of two devices for searching for another device in which the impact event has occurred at the same point in time (in around the same time).

Referring to FIG. 3, when an impact event has occurred between two devices, each of a device A and a device B makes a data transmission attempt so as to search for another device in which the impact event has occurred at the same point in time (in around the same time) randomly based on a time (a point in time) at which its impact event has occurred and transitions to a data reception standby state during the remaining time.

Here, data transmitted from one device (the device A or the device B) to the other device is a search message including a time (point in time) at which the impact event occurs represented by a timer driving count value of an own device. The other device (the device B or the device A) having received the search message recognizes the counterpart device as the device in which the impact event has occurred at the same point in time (in around the same time) when the timer driving count value of the counterpart device included in the search message matches with its timer driving count value. The algorithm for searching for the device in which the impact event has occurred illustrated in FIG. 3 uses a most simple random method, and the present invention is not limited to this algorithm.

As illustrated in FIG. 3, the impact events have occurred at a time T10 in the device A and the device B, and a point in time at which the impact event occurs is represented by a numeral "0." After the point in time at which the impact event occurs, the timer of each device is driven and starts counting.

Basically, in a data reception standby state, each of the device A and the device B is on standby to receive data transmitted from another device in which the impact event has occurred at the same point in time (in around the same time). However, at a random point in time, each device actively performs data transmission for searching for another device in which the impact event has occurred at the same point in time (in around the same time).

Referring FIG. 3 the device A and the device B perform data transmission for searching for another device in which the impact event has occurred at the same point in time (in around the same time) at the same time T20 which is randomly selected. However, the two devices fail to search for each other due to data transmission performed at the same time. Thereafter, at a time T30, the device A performs data transmission, and the device B performs data reception. Thus, the two devices are successful in searching for each other and then establish the wireless network connection between the devices by performing the predetermined protocol.

The example of FIG. 3 has been described with connection with each device including one NFC wireless communication unit (single RF module). However, when each device includes multiple (two or more) wireless communication units, the two devices can be successful in searching for each other even when data transmission of the device A and data reception of the device B (or data reception of the device A and data transmission of the device B) are performed at the same time.

Meanwhile, in the present invention, the inter-device wireless network connection release process is similar to the above-described inter-device wireless network connection establishing process.

For example, when devices having the wireless network connection receive an impact event in a state in which the wireless network connection release function is activated, each device performs a predetermined protocol with a searched device according to a result of searching for another device in which the impact event has occurred at the same point in time (in around the same time) and so releases the inter-device wireless network connection.

As described above, in the present invention, when the users apply physical impacts to the devices, the inter-device wireless network connection can be easily established or released.

Further, various additional techniques may be modified and additionally applied according to a network environment or an application in which the basic algorithm of the wireless network connection control method using the physical impact according to the present invention is utilized. Further, various additional techniques which will be described later may be modified and additionally applied to an application program control method using physical impact according to the present invention.

Firstly, a locking function using a button or the like capable of activating/deactivating the inter-device wireless network connection control function may be set. For example, in order to prevent a phenomenon that the inter-device wireless network connection control is automatically performed when physical impacts are applied to the devices and a wireless network connection unintended by the user is established or released, the wireless network connection control locking function may be set according the user's selection.

Secondly, a group ID concept may be used. For example, a group ID may be included in the transmission data used in the process of searching for the device in which the impact event has occurred, and the inter-device wireless network connection establishing/releasing control may be performed so that the wireless network connection can be established or released only between devices having the corresponding group ID. Further, after the wireless network connection is established, a device function, a device right, or the like may be restricted. The group ID is preferably set by individuals, an exclusive social network service (SNS), an organization (a company or the like), or the like. When the group ID is used, security according to the inter-device wireless network connection can be reinforced.

Thirdly, in the basic wireless network connection control algorithm, the devices operate based on a relative time, at which the impact event has occurred, counted by the timer. However, the devices may operate based on an absolute time in comparing times at which the impact event has occurred when the devices can know the absolute time through a global positioning system (GPS) module, an internal clock, or a mobile communication network synchronization time (that is, when an absolute time acquiring unit is provided).

In an embodiment in which the devices operate based on the absolute time, the devices may additionally generate a random number (encryption information) using a corresponding absolute time as a seed and include the random number in the transmission data used in the process of searching for the device in which the impact event has occurred, and the inter-device wireless network connection establishing/releasing control may be performed between devices that have decrypted the random number.

Of course, the random number may be generated using the aforementioned group ID. In this case, the group ID-based random number may be included in the transmission data used in the process of searching for device in which the impact event has occurred. Alternatively, the random number may be generated using both the group ID and the absolute time. In this case, the random number based on both the group ID and the absolute time may be included in the transmission data used in the process of searching for the device in which the impact event has occurred. When the random number based on the group ID and/or the absolute time is used, security according to the inter-device wireless network connection can be further reinforced.

Fourthly, the user's additional control related to establishment and release of the inter-device wireless network connection may be performed according to the number of times physical impacts are applied to the devices by the user. For example, in the case in which the wireless network connection is established when one physical impact is applied once to the devices within a certain time, data transmission and reception between devices may be performed at a period of five minutes. Further, in the case in which the connection is established when physical impact is applied twice to the devices within a certain time, data transmission and reception between devices may be performed at a period of one minute. That is, by representing the user's additional control through the number of physical impact times, a value related to connection settings between the devices including a data transmission/reception period can be changed.

Fifthly, the user's additional control related to device mode switching may be performed according to different numbers of times a physical impact is applied to the devices. For example, in the case in which the wireless network connection is established between two devices when a physical impact is applied to the device A and then impacts are consecutively applied to the device A and the device B, at the time of wireless network connection, the device A senses a physical impact twice, and the device B senses a physical impact once. Thus, a wireless network connection relation may be set based on the difference in the number of physical impact times between the devices. For example, one device (the device A or the device B) may be set as a parent node, and the other device (the device B or the device A) may be set as a child node.

Sixthly, the inter-device wireless network connection relation may be set using measurement data obtained by an additionally mounted sensor as well as different numbers of times of physical impacts described above.

For example, when the devices are provided with an acceleration sensor, the inter-device wireless network connection relation may be set by comparing device movement values before or after the impact event has occurred. The acceleration sensor is an example of a sensor for sensing movement of the position of the device so as to differentiate the devices. The acceleration sensor may be implemented by various sensors.

That is, each device in which the impact event has occurred at the same point in time (in around the same time) calculates a movement value (which may be represented by a predetermined value or the magnitude) before or after the impact event occurred through the acceleration sensor. The movement value is included in the transmission data in the process of searching for the device in which the impact event has occurred and transmitted to another device. The wireless network connection relation is set such that each device is set as a parent node or a child node based on a comparison result between the movement values of the devices. For example, a device having a relatively small movement value is determined as being in a fixed state and thus is set as the parent node, and a device having a relatively large movement value is determined as being in a moving state and thus is set as the child note.

As another example, when the devices are provided with a motion sensor, the inter-device wireless network connection relation may be set based on motion values of the devices before or after the impact event has occurred. The motion sensor is a means for sensing device rotation, shaking, alphanumerical expressions, or the like by the user.

For example, each device in which the impact event has occurred at the same point in time (in around the same time) calculates a motion value (for example, a clockwise rotation value, a shaking value of a predetermined number of times, or a specific alphanumerical expression value) before or after the impact event has occurred through the motion sensor. The motion value is included in the transmission data in the process of searching for the device in which the impact event has occurred and transmitted to another device. The wireless network connection relation is set such that each device corresponding to a previously defined motion value is set as a parent node or a child node based on its motion value and another device's motion value. For example, a device in which shaking has been performed once by the user may be set as the parent node, and a device in which shaking has been performed twice by the user may be set as the child note. As another example, a device having sensed a motion of P may be set as a parent device, and a device having sensed a motion of C may be set as a child device.

As another example, when the devices are provided with a voice sensor (a voice recognizer) or an acoustic sensor (a phonometer), the inter-device wireless network connection relation may be set based on voice values (or acoustic values) of the devices before or after the impact event has occurred. The voice sensor is a means for recognizing words or the like within a voice, uttered from the user, which is input to the device, and the acoustic sensor is a means for measuring a value of a sound input to the device.

For example, each device in which the impact event has occurred at the same point in time (in around the same time) recognizes a voice value (for example, parent and child) before or after the impact event has occurred through the voice sensor. The voice value is included in the transmission data in the process of searching for the device in which the impact event has occurred and transmitted to another device. The wireless network connection relation is set such that each device corresponding to a previously defined voice value is set as a parent node or a child node based on its voice value and another device's voice value. For example, a device in which the user has uttered "parent" may be set as the parent node, and a device in which the user has uttered "child" may be set as the child note.

Meanwhile, as described above, the device performs the process of searching for another device in which the impact event has occurred at the same point in time (in around the same time) based on the timer-based time or the absolute time.

However, all hardware clocks for time driving have an error. The error value increases as a time elapses after the point in time at which the impact event occurs. Accumulation of the error value may cause erroneous determination. For example, even if the physical impacts are applied at the same point in time (in around the same time ), it may be determined that the impact events have been applied to the devices at different times.

For this reason, in the present invention, the device performs a process of searching for another device in which the impact event has occurred at the same point in time (around the same time) during a time period corresponding to a device search error allowable range value obtained by setting an error range value of a time driving clock generated by hardware in proportion to an elapsed time after the impact event has occurred. For example, the device search problem caused by the hardware time driving clock error can be resolved. This can be represented by Formula 1:

$$|\epsilon_{i(t)}| \leq \alpha * t \ \forall \ i \in 1 \ldots n|$$ Formula 1 where $\epsilon$ represents a time error value, $\alpha$ represents a hardware time driving clock error value [ppm], n represents a total of the number of devices, $t_0$ represents a time (a point in time) at which the impact event has occurred, t represents an elapsed time, and r represents a device search error allowable range value.

That is, an absolute time to error range of an arbitrary device is represented by Formula 1, and if it is summarized for all devices, Formula 2 is derived.

$$\alpha * t = \epsilon_{(t)}|$$ Formula 2

A maximum value and a minimum value of the absolute time to error range based on Formula 2 are represented by Formula 3.

$$\epsilon_{(t)max} = t_0 + t + \epsilon_{(t)}$$

$$\epsilon_{(t)min} = t_0 + t - \epsilon_{(t)}$$ Formula 3

An error value allowable range which an arbitrary device calculates on another device based on Formula 3 should be twice an occurrence error range and is represented by Formula 4.

$$r_{(t)max} = t_0 + t + 2 * \epsilon_{(t)}$$

$$r_{(t)min} = t_0 + t - 2 * \epsilon_{(t)}$$ Formula 4

Figure 4:
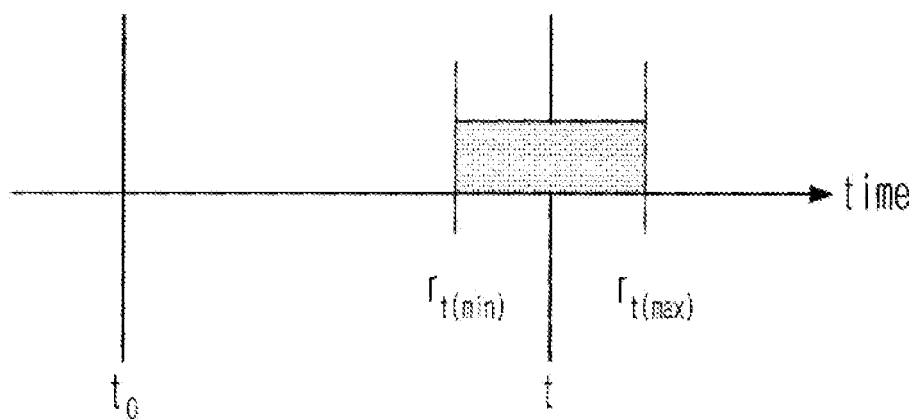
FIG. 4 is an explanatory diagram illustrating a device search error allowable range value.

FIG. 4 is an explanatory diagram illustrating a device search error allowable range value. In particular, FIG. 4 shows an error range that should be allowed at a time t when an arbitrary device searches for another device in which the impact event has occurred at the same point in time (in around the same time) at a time $t_0$.

Next, a description will be made in connection with a second embodiment, for example, an application program control method using a physical impact of performing corresponding control related to setting and execution of an application program when physical impacts are applied to the devices.

An application program control method using a physical impact may be implemented in a similar manner to the first embodiment (the wireless network connection control method using the physical impact).

For example, after the network connection is established between the devices according to the first embodiment of the present invention or the existing method (in a state in which a wireless network is connected between the devices), when physical impacts are applied to the devices, each of the devices recognizes the occurrence of the impact event (preferably recognizes an application program control impact event) and searches for another device in which the impact event has occurred at the same time (in around the same time) based on the time at which the impact event occurs.

Thereafter, when the device search is successful, each of the devices transfers the result of searching for the device in which the impact event has occurred to an application program. The application program changes settings corresponding to device search result information or executes a function corresponding thereto (for example, changes an access right in a connection between the two devices or starts/finishes data transmission).

It would be easily understood by those skilled in the art that the various additional techniques described in the first embodiment of the present invention can also be applied to the second embodiment. For example, a network relation, a role, or the like defined in a network or an application program may be discriminately set (assigned) to devices participating in a wireless network.

Lastly, application examples of the first embodiment and the second embodiment of the present invention will be concretely described.

As described above, the present invention can be utilized in a wireless network such as a sensor network or any product based on wireless communication such as a mobile device such as a smart phone or a mobile phone, a media device such as a wireless USB memory, a smart card, an MP3 player, or a PMP, a radio, a notebook computer, a wireless controller (mote), and the like. Further, the present invention can be applied to a system such as a person to person (P2P) between devices or a machine to machine (M2M), a service, a solution, and the like.

Specifically, for example, when the present invention is applied to the sensor network, a normal user who is not an expert can simply designate a network routing path between devices. Thus, energy efficiency can be improved in a fixed communication circumstance, and the user can configure a network of a desired form. This can be manufactured and sold as a product such as a sensor network kit that can be simply installed directly and used by the user.

Meanwhile, when the present invention is applied to the application program, the user can easily assign a different duty to each device. This can be reflected in real time to operate a corresponding application of the device.

Meanwhile, when the present invention is applied to a P2P connection between mobile devices, the corresponding devices can establish a wireless communication connection when physical impacts are applied to the mobile devices and can generate and provide the infrastructure of a network program. The user's will on the wireless communication connection can be sufficiently expressed compared to the existing method of searching for all of neighboring devices, and thus a safe P2P connection can be guaranteed. Further, the user's extended control intention is expressed by the various additional techniques suggested in the present invention, and thus the user can perform a desired operation without operating other interfaces of the mobile device.

Meanwhile, when the present invention is applied to an M2M connection, the same effect as in the P2P connection can be obtained. For example, when a wireless network connection is established between a mobile device and a display device according to the present invention, it may be used in a technique of transferring a screen of contents replayed in the mobile device to the display device.

Meanwhile, when the present invention is applied to the wireless USB memory, the dongle may be separated from the body, and a method of establishing a connection with another device that supports a USB through a physical impact (contact) may be used instead of the existing method of performing communications between the two devices. For example, even when there are many personal computers (PCs), the user can establish a desired wireless network connection by applying a simple impact event to a computer desired to connect and a USB device. For example, in the case of the WPAN of the existing method, there is a problem in terms of security and efficiency since many computers may make an attempt to access the USB memory. Further, the existing method using the dongle requires a task of directly connecting the dongle at each network connection when it is not a fixed circumstance. The user actually feels no difference with a wireline connection. These points can be confirmed as points improved by the technique suggested in the present invention.

Meanwhile, when the present invention is applied to the MP3 player, a sound or music of contents replayed in the MP3 player may be provided to the user via a separate speaker through an M2M connection.

Meanwhile, when the present invention is applied to the smart card, the present invention can be applied to one security device as a tool of controlling a smart card connection. Further, the present invention can be utilized for transactions between the smart card and the smart card or the like through various control inputs.

In applying the present invention to currently sold products, all devices should be supported by a hardware device related to a wireless network connection. For this reason, it is advantageous in terms of a business model to preferentially apply the present invention to a connection between devices of the same type rather than a connection between devices of different types and to a field having a local closed network characteristic such as a newly constructed/sold sensor network rather than a personal device such as a mobile device that is relatively slow in hardware function support (for example, device change) or needs an individual's investment.

Meanwhile, the above-described various methods of the present invention may be implemented by a computer program. Codes or code segments configuring the computer program can be easily inferred by a computer programmer of a corresponding field. The computer program may be stored in a computer readable recording medium (information storage medium) and may be read and executed by a computer to thereby implement the method of the present invention. The recording medium includes computer readable recording media of all types.

It will be apparent to those skilled in the art that various modifications, substitutions, and changes can be made to the above-described exemplary embodiments of the present invention without departing from the spirit or scope of the invention. Thus, the present invention is no limited to the above embodiments and the accompanying drawings.

What is claimed is:

1. A wireless network connection control method of a device using a physical impact, comprising:
   generating a first impact event when the physical impact applied to the device being a first device from the outside is detected;

transmitting a search message including the time at which the first impact event occurred and searching for a second device in which the first impact event occurred at the same time;

performing a predetermined protocol with the second device and establishing an inter-device wireless network connection with the second device when the second device is found as a result of the searching;

when the second device is not found as a result of the searching, recognizing by the first device, the first impact event as having occurred only in the first device and causing by the first device, the first device to enter a predetermined state;

performing by the first device, a predetermined operation when a second impact event occurs in the first device within a time period from the time in which the first impact event occurred, the second impact event occurring in the predetermined state of the first device which was entered when the second device was not found;

sensing by each of the first device and the second device. at least one impact event while the inter-device wireless network connection is established between the first device and the second device; and setting the first device as a first mode and setting the second device as a second mode different from the first mode based on a difference between the number of impact event sensed by the first device and the number of impact event sensed by the second device.

2. The method of claim 1, wherein the first impact event is generated when a sensed impact value exceeds a predetermined threshold.

3. The method of claim 1, wherein the time at which the first impact event occurred included in the search message is represented by a timer driving count value of the first device.

4. The method of claim 1, wherein the time at which the first impact event occurred included in the search message is represented by an absolute time.

5. The method of claim 3, wherein the searching for the second device performs searching for a device during a time period corresponding to a device search error allowable range value obtained by setting an error range value of a time driving clock of the first device in proportion to the time elapsed since the first impact event.

6. The method of claim 1, wherein the performing the predetermined operation comprises creating a special predefined connection with another device.

7. The method of claim 1, further comprising:

generating a wireless network connection release impact event when an impact applied to the first device from the outside is sensed in a state in which a wireless network is connected between the first device and the second device;

upon generating the wireless connecting release impact event, transmitting a search message to find devices which have generated impact events at the same time as the release impact event; and when a device found as the search result is a device that is already connected, performing a predetermined protocol with the found device and releasing an inter-device wireless network connection with the found device.

8. The method of claim 1, further comprising providing a user with the content of the process of establishing the wireless network connection, the content of the process of establishing the wireless network connection in the special relation, or the content of the process of releasing the wireless network connection, wherein advanced settings or function change settings are performed by the user's selection.

9. The method of claim 1, wherein when a device without an impact sensor receives a device search message on the occurrence of an impact event from another device having an impact sensor, the content of the received device search message is provided to a user via a user interface, and the wireless network connection is established or released between the device without an impact sensor and the device having an impact sensor by the user's selection.

10. The method of claim 1, wherein the search message includes a group ID.

11. The method of claim 10, wherein the search message includes encryption information using the time at which the first impact event occurred as a seed, encryption information using the group ID as a seed, and encryption information using the time at which the first impact event occurred and the group ID as a seed.

12. The method of claim 1, wherein the user can control additional settings regarding the frequency of data transmissions, by varying the number of impact events.

13. The method of claim 1, wherein an inter-device wireless network connection relation is set based on a comparison of movement values of the first device and the second device before or after the first impact event occurred or based on motion values of the first device and the second device before or after the first impact event occurred.

14. The method of claim 1, wherein an inter-device wireless network connection relation is set based on voice values (or acoustic values) of the first device and the second device before or after the first impact event occurred.

15. The method of claim 1, wherein the generation of the first impact event is suppressed when a certain wireless network connection control lock is set.

16. An application program control method of a device using a physical impact, comprising:

generating by the device being a first device, a first impact event when the physical impact applied to the first device from the outside is detected in a state in which a wireless network is connected between the first device and a second device;

transmitting a search message including the time at which the first impact event occurred and searching for the second device in which the first impact event occurred at the same time;

transferring the search result to an application program and executing functions provided by the application program and changing settings of the first device when the second device is found as the search result;

when the second device is not found as the search result, recognizing by the first device, the first impact event as having occurred only in the first device, and causing by the first device, the first device to enter a predetermined state;

performing by the first device, a predetermined operation when a second impact event occurs in the first device within a time period from the time in which the first impact event occurred, the second impact event occurring in the predetermined state of the first device which was entered when the second device was not found;

sensing by each of the first device and the second device, at least one impact event while the inter-device wireless network connection is established between the first device and the second device: and setting the first device as a first mode and setting the second device as a second mode different from the first mode based on a difference between the number of impact event sensed by the first device and the number of impact event sensed by the second device.

17. The method of claim 16, wherein the performing the predetermined operation comprises creating a pre-defined connection with another device.

18. The method of claim 16, wherein the generating of the first impact event includes generating a corresponding impact event when the sensed impact value exceeds a predetermined threshold.

19. The method of claim 16, wherein the time at which the first impact event occurred included in the search message is represented by a timer driving count value of the first device.

20. The method of claim 16, wherein the time at which the first impact event occurred included in the search message is represented by an absolute time.

21. The method of claim 19, wherein the searching for the second device performs searching for a device during a time period corresponding to a device search error allowable range value obtained by setting an error range value of a time driving clock of the first device in proportion to the time elapsed since the impact event.

22. The method of claim 16, comprising providing a user with the content of the process of performing execution of an application program function and changing of settings or the content of the process of executing a pre-defined special function, wherein further advanced settings or function change settings may be performed by the user.

23. The method of claim 16, wherein when a device without an impact sensor receives a device search message on the occurrence of an impact event from another device, the content of the received device search message is provided to the user via a user interface, and the execution of an application program function between the device without an impact sensor and the another device and changing of settings or execution of the previously defined special function are performed by the user's selection.

24. The method of claim 16, wherein the search message includes a group ID.

25. The method of claim 24, wherein the search message includes encryption information using the time at which the first impact event occurred as a seed, encryption information using the group ID as a seed, and encryption information using the time at which the first impact event occurred and the group ID as a seed.

26. The method of claim 16, wherein the user can control additional setting regarding the wireless connection by varying the number of impact events.

27. The method of claim 16, wherein an inter-device wireless network connection relation is set based on a comparison of movement values of the first device and the second device before or after the first impact event occurred or based on motion values of the first device and the second device before or after the first impact event occurred.

28. The method of claim 16, wherein an inter-device wireless network connection relation is set based on voice values (or acoustic values) of the first device and the second device before or after the first impact event occurred.

29. The method of claim 16, wherein the generation of the first impact event is suppressed when a certain connection control lock is set in the application program.

30. A non-transitory computer readable recording medium recording a program for causing a computer to execute a wireless network connection control method of a device using a physical impact, the method comprising:
generating a first impact event when the physical impact applied to the device being a first device from the outside is detected;
transmitting a search message including the time at which the first impact event occurred and searching for a second device in which the first impact event occurred at the same time;
performing a predetermined protocol with the second device and establishing an inter-device wireless network connection with the second device when the second device is found as a result of the searching;
when the second device is not found as a result of the searching, recognizing by the first device, the first impact event as having occurred only in the first device and causing by the first device, the first device to enter a predetermined state;
performing by the first device, a predetermined operation when a second impact event occurs in the first device within a time period from the time in which the first impact event occurred, the second impact event occurring in the predetermined state of the first device which was entered when the second device was not found;
sensing by each of the first device and the second device, at least one impact event while the inter-device wireless network connection is established between the first device and the second device; and
setting the first device as a first mode and setting the second device as a second mode different from the first mode based on a difference between the number of impact event sensed by the first device and the number of impact event sensed by the second device.

31. A device with close-range wireless communication functionality including Wireless Personal Area Network (WPAN) or Wireless Local Area Network (WLAN) comprising:
a sensor that measures a physical impact received by the device being a first device; and
a communication unit that performs communication with an external device;
a control unit, including a processor, that, when the measured impact exceeds a predetermined threshold, detects occurrence of a first impact event, and controls the communication unit to transmit a search message including the time at which the first impact event occurred to search for a second device in which the first impact event occurred at the same time,
wherein the control unit performs a predetermined protocol with the second device and establishes an inter-device wireless network connection with the second device when the second device is found as a result of the searching, and wherein when the second device is not found as a result of the searching, the control unit recognizes the first impact event as having occurred only in the first device, and causes the first device to enter a predetermined state, and the control unit performs a predetermined operation when a second impact event occurs in the first device within a time period from the time in which the first impact event occurred, the second impact event occurring in the predetermined state of the first device which was entered when the second device was not found, and
wherein the control unit detects occurrence of at least one impact event while the inter-device wireless network connection is established between the first device and the second device, and sets the first device as a first mode different from a second mode of the second device based on a difference between the number of impact event sensed by the first device and the number of impact event sensed by the second device.

32. The device of claim 31, further comprising a timer that counts the time at which the first impact event occurred,
wherein the control unit includes a count value acquired by the timer in the search message as the time at which the first impact event occurred.

33. The device of claim 31,
wherein the control unit includes an absolute time at which the first impact event occurred, in the search message.

34. The device of claim 31, wherein the control unit has the following additional function: when the sensor senses an impact value exceeding the predetermined threshold in a state in which a wireless network is already connected between the first device and the second device, a wireless network connection releasing impact event is generated, a search message is transmitted from the first device through a wireless communication unit based on the time at which the wireless network connection releasing impact event occurred, and the connection with the second device in which an impact event occurred at the same time is terminated.

35. The device of claim 31, wherein when the sensor senses an impact value exceeding the predetermined threshold value in a state in which a wireless network is already connected between the first device and the second device, the control unit changes settings of a corresponding function provided by a corresponding application program or executes the corresponding function between the first device and the second device by generating an application program control impact event, by transmitting a search message from the first device to the second device through a wireless communication unit based on a time at which the application program control impact event occurred, and searching for the second device in which the application program control impact event has occurred at the same time.

36. A non-transitory computer readable recording medium recording a program for causing a computer to execute an application program control method of a device using a physical impact, the method comprising:
generating by the device being a first device, a first impact event when the physical impact applied to the first device from the outside is detected in a state in which a wireless network is connected between the first device and a second device;
transmitting a search message including the time at which the first impact event occurred and searching for the second device in which the first impact event occurred at the same time;
transferring the search result to an application program and executing functions provided by the application program and changing settings of the first device when the second device is found as the search result;
when the second device is not found as the search result, recognizing by the first device, the first impact event as having occurred only in the first device, and causing by the first device, the first device to enter a predetermined state;
performing by the first device, a predetermined operation when a second impact event occurs in the first device within a time period from the time in which the first impact event occurred, the second impact event occurring in the predetermined state of the first device which was entered when the second device was not found;
sensing by each of the first device and the second device, at least one impact event while the inter-device wireless network connection is established between the first device and the second device; and
setting the first device as a first mode and setting the second device as a second mode different from the first mode based on a difference between the number of impact event sensed by the first device and the number of impact sensed by the second device.

* * * * *